US010116571B1

(12) United States Patent
Bertz et al.

(10) Patent No.: US 10,116,571 B1
(45) Date of Patent: Oct. 30, 2018

(54) NETWORK FUNCTION VIRTUALIZATION (NFV) MANAGEMENT AND ORCHESTRATION (MANO) WITH APPLICATION LAYER TRAFFIC OPTIMIZATION (ALTO)

(71) Applicant: Sprint Communications Company L.P., Overland Park, KS (US)

(72) Inventors: Lyle T. Bertz, Lee's Summit, MO (US); Laurent Alexandre Laporte, Spring Hill, KS (US); William A. James, Overland Park, KS (US); Robert Keith Butler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 467 days.

(21) Appl. No.: 14/858,228

(22) Filed: Sep. 18, 2015

(51) Int. Cl.
*G06F 15/173* (2006.01)
*H04L 12/801* (2013.01)
*H04L 29/08* (2006.01)
*H04L 12/751* (2013.01)

(52) U.S. Cl.
CPC .............. *H04L 47/19* (2013.01); *H04L 45/02* (2013.01); *H04L 69/329* (2013.01)

(58) Field of Classification Search
CPC ....... G06F 9/45558; G06F 2009/45595; G06F 9/5077; G06F 2009/4557; G06F 9/455; G06F 17/30554; G06F 2009/45579; G06F 21/575; G06F 3/04845; H04L 12/4641; H04L 67/10; H04L 41/12; H04L 41/0806
See application file for complete search history.

(56) References Cited

U.S. PATENT DOCUMENTS 8,665,699 B2  3/2014 Bellagamba et al.
8,686,838 B1  4/2014 Eiriksson et al.
2006/0171320 A1* 8/2006 Vasseur ................... H04L 45/02
370/238

(Continued)

FOREIGN PATENT DOCUMENTS

WO   2007123517   11/2007
WO   2015055102   4/2015

OTHER PUBLICATIONS

U.S. Appl. No. 14/753,536, filed Jun. 29, 2015.

Primary Examiner — Tauqir Hussain
Assistant Examiner — Thao Duong

(57) ABSTRACT

A Network Function Virtualization (NFV) Management and Orchestration (MANO) data system supports an Application Layer Traffic Offload (ALTO) system for a Network Service (NS). An orchestrator exchanges network data with a Virtualized Infrastructure Manager (VIM) to support the NS. The orchestrator exchanges function data with a Virtual Network Function Manager (VNFM) to support the NS. The VIM exchanges the network data with NFV Infrastructures (NFVIs) to execute Virtual Machines (VMs) that instantiate Virtual Network Functions (VNFs) to support the NS. The VNFM exchanges the function data with the VNFs to support the NS. The NFV MANO orchestrator indexes some of the network data and the function data to generate NFV ALTO topology data that associates individual ALTO Provider Identifiers (PIDs) with individual ones of the NFVIs and with individual ones of the NFV VNFs.

14 Claims, 6 Drawing Sheets

(56) References Cited

U.S. PATENT DOCUMENTS

| | | |
|---|---|---|
| 2013/0010600 A1 | 1/2013 | Jocha et al. |
| 2013/0343295 A1 | 12/2013 | Deo |
| 2014/0201374 A1* | 7/2014 | Ashwood-Smith ..... H04L 49/70 709/226 |
| 2014/0229945 A1 | 8/2014 | Barkai et al. |
| 2014/0254373 A1 | 9/2014 | Varma |
| 2014/0317261 A1 | 10/2014 | Shatzkamer et al. |
| 2014/0341199 A1 | 11/2014 | Jeon et al. |
| 2015/0063166 A1 | 3/2015 | Sif et al. |
| 2015/0288541 A1* | 10/2015 | Fargano ................. H04L 43/08 709/225 |
| 2016/0212017 A1* | 7/2016 | Li ........................... H04L 41/20 |
| 2016/0373474 A1* | 12/2016 | Sood ................... H04L 63/1425 |
| 2016/0380886 A1* | 12/2016 | Blair ...................... H04L 45/50 398/49 |

\* cited by examiner

US 10,116,571 B1

NETWORK FUNCTION VIRTUALIZATION (NFV) MANAGEMENT AND ORCHESTRATION (MANO) WITH APPLICATION LAYER TRAFFIC OPTIMIZATION (ALTO)

TECHNICAL BACKGROUND

Data communication networks operate computer systems to provide various data services. The data services include internet access, media conferencing, file access, messaging, content delivery, and the like. The computer systems execute networking software to forward data packets for the data services. The networks use traffic managers to optimize network operations.

Data communication networks may use Application Layer Traffic Offload (ALTO) systems to generate network data communication cost models. ALTO systems have geographic regions called Provider Identifiers (PIDs). A PID often represents a market zone like a city or town. ALTO systems continually track the usage, cost, and performance of the network on a per-PID basis. The per-PID network costs are aggregated to create PID-to-PID costs for the data communication services.

The data communication networks increasingly use Network Function Virtualization (NFV) computer infrastructures to execute their networking software. The NFV Infrastructures (NFVIs) distribute the execution of the networking software across various processing cores, time cycles, memories, and I/O ports. The networking software comprises Virtual Machines (VMs) and Virtual Network Functions (VNFs) that are installed, executed, and terminated as new data services are introduced and replaced. Likewise, the NFVI undergoes change as the processors, memories, I/O ports, and hypervisor software are also introduced and replaced. This dynamically changing NFVI environment is controlled by an NFV Management and Orchestration (MANO) data communication system.

The NFV MANO system drives the NFVI to support various network services. For a given Network Service (NS), the NFV MANO system receives data from network operations and responsively transfers network data to the NFVI. In response to the network data, the NFVI executes the proper VMs and VNFs using the appropriate NFVI processing cores, time cycles, memories, and I/O ports to support delivery of the NS.

Unfortunately, NFV and ALTO systems are not effectively or efficiently integrated. The dynamic NFVI and VNF environments overwhelm ALTO systems and inhibit accurate and dynamic NFV cost analysis.

TECHNICAL OVERVIEW

A Network Function Virtualization (NFV) Management and Orchestration (MANO) data system supports an Application Layer Traffic Offload (ALTO) system for a Network Service (NS). An orchestrator exchanges network data with a Virtualized Infrastructure Manager (VIM) to support the NS. The orchestrator exchanges function data with a Virtual Network Function Manager (VNFM) to support the NS. The VIM exchanges the network data with NFV Infrastructures (NFVIs) to execute Virtual Machines (VMs) that instantiate Virtual Network Functions (VNFs) to support the NS. The VNFM exchanges the function data with the VNFs to support the NS. The NFV MANO orchestrator indexes some of the network data and the function data to generate NFV ALTO topology data that associates individual ALTO Provider Identifiers (PIDs) with individual ones of the NFVIs and with individual ones of the NFV VNFs.

DETAILED DESCRIPTION

Figure 1:
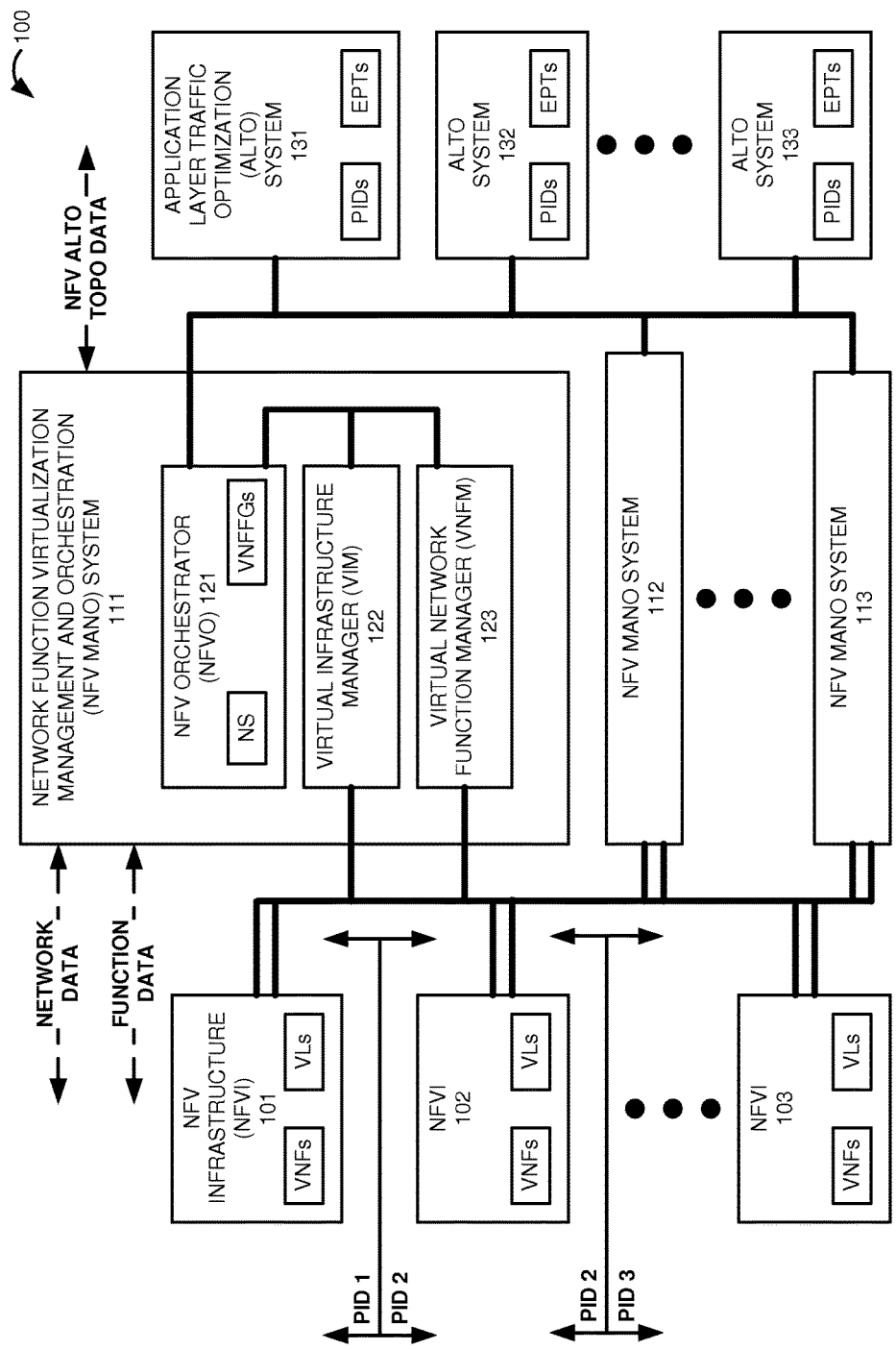
FIG. 1 illustrates a Network Function Virtualization Management and Orchestration (NFV MANO) data communication network to support an Application Layer Traffic Offload (ALTO) system for a Network Service (NS).

FIG. 1 illustrates Network Function Virtualization Management and Orchestration (NFV MANO) data communication network 100 to support an Application Layer Traffic Offload (ALTO) system for a Network Service (NS). The NS might be video conferencing, multimedia messaging, media streaming, Internet access, or some other data communication service. NFV MANO data communication network 100 comprises NFV Infrastructures (NFVIs) 101-103, NFV MANO systems 111-113, and ALTO systems 131-133. NFVIs 101-103 are physically located in respective ALTO Provider Identifiers (PIDs) 1-3. PIDs 1-3 represent geographic areas like cell coverage footprints, paging tracking areas, subscriber market zones, cities/states/counties, and the like.

NFVIs 101-103 execute Virtual Machines (VMs) that instantiate Virtual Network Functions (VNFs) for the NS. NFVIs 101-103 also create Virtual Links (VLs) to support the NS. ALTO systems 131-133 determine and maintain current data communication costs between PIDs 1-3 for various End-Points (EPTs) that are often the VNFs themselves. For example, ALTO system 131 may provide NS-specific cost metrics for data communications between PID 1 and PID 3 for a pair of VNFs. The NFV ALTO cost metrics track resource consumption versus resource costs in the NFVIs on a PID-to-PID basis. The PID-to-PID NFV costs are aggregated with physical link costs between the NFVIs that may be determined by ALTO systems 130-131 in the standard manner. Using the indexed and integrated NFV/ALTO data, more efficient network operations are achievable. For example, the PID 1/PID 3 costs of three different VNF Forwarding Graphs (VNFFGs) are readily available during data flow set-up for comparison and selection.

MANO systems 111-113 exchange network data and function data with NFVIs 101-103. MANO systems 101-103 exchange NFV ALTO topology data with ALTO systems 131-133. MANO system 111 comprises NFV Orchestrator (NFVO) 121, Virtualized Infrastructure Manager (VIM) 122, and VNF Manager (VNFM) 123. NFVO 121 implements VNF Forwarding Graphs (VNFFGs) that logically link various VNFs and VLs to support the NS. VIM 122 exchanges the network data between NFVO 121 and NFVIs 101-103. VNFM 123 exchanges the function data between NFVO 121 and the VNFs and VLs executing in NFVIs 101-103. NFVO 121 exchanges the NFV ALTO topology data with ALTO systems 131-133. MANO systems 112-113 would have similar configurations and operations to MANO system 111.

NFVIs 101-103 comprise computer circuitry, data memories, communication interfaces, and software. The software includes hypervisors, operating systems, VMs, network controllers, and the like. NFVIs 101-103 allocate their data processing resources among various software components. For example, an NFVI hypervisor may drive 16 Central Processing Unit (CPU) cores to execute multiple VMs, VNFs, and VLs in parallel at pre-scheduled times. The NFVI hypervisor may also allocate data specific memories and communication interfaces to the executing VMs, VNFs, and VLs. NFVIs 101-103 further sub-divide their data processing resources in the time domain using context switching. NFVIs 101-103 also allocate the resulting data processing time slices to the VMs, VNFs, and VLs.

NFV MANO systems 111-113 comprise computer systems and software that may be discrete, shared, or hosted by an NFVI. For the NS, the VNFs are coupled to the VLs based on the VNFFGs. Some VLs are also coupled to the physical network in the form of Physical Network Functions (PNFs) per the VNFFGs. Some VLs are coupled to external ALTO domains that are not integrated into the ALTO topography and do not have known ALTO PIDs. Standard ALTO operations may be used to track and add the costs of the physical network links.

ALTO systems 131-133 comprise computer systems and software that may be discrete, shared, or hosted by an NFVI. For the NS, ALTO systems 131-133 continuously determine estimated costs for data communication services within and between various PIDs. Thus, ALTO systems 131-133 continuously use the NFV ALTO topology data that individually associates the ALTO PIDS and external ALTO domains with the NFV NS, VNFFGs, NFVIs, VNFs, VLs, PNFs, and their respective performance, usage, and costs. Typically, the NFV ALTO topology data also correlates the external domains, NFV NS, VNFFGs, NFVIs, VNFs, VLs, and PNFs with their reported IP prefixes, IP addresses, Ethernet addresses, and the like. Thus, ALTO systems 131-133 may readily determine the NS PID-to-PID costs for groups of IP addresses and/or IP prefixes. Likewise, ALTO systems 131-133 may determine the NS PID-to-external ALTO domain costs for groups of IP addresses and/or IP prefixes.

In operation, NFVO 121 exchanges network data with VIM 122 to support the NS. The network data indicates individual VM/VNF/VL/PNF/NFVI associations, requirements, and context. NFVO 121 exchanges function data with VNFM 123 to support the NS. The function data indicates VNF and NFVI performance requirements for the NS. VIM 122 exchanges the network data with NFVIs 101-103 to drive NFVIs 101-103 to create the VLs and execute the VMs that instantiate the VNFs to support the NS. VNFM 123 exchanges the function data with the VNFs and VLs to drive the VNFs and VLs to support the NS.

NFVO 121 indexes portions of the network data and the function data to generate NFV ALTO topology data. The NFV ALTO topology data associates individual ALTO PIDs 1-3 with respective individual NFVIs 101-103. The NFV ALTO topology data further associates the individual ALTO PIDs 1-3 with individual VNFs. NFVO 121 transfers the NFV ALTO topology data for delivery to ALTO systems 131-133. ALTO systems 131-133 process the topology data to develop NFV NS costs between ALTO PIDs. In a similar manner to the PIDs, NFV NS costs between ALTO PIDs and external ALTO domains are also tracked.

NFVO 121 may index the network and function data to generate rich NFV ALTO topology data. For example, NFVO 121 may individually associate the VNFs with ALTO EPTs, scaled NFVI/VNF resources and costs, IP addresses/prefixes, and other data. Likewise, NFVO 121 may individually associate the VLs and NFVIs with PIDs, usage, performance, costs, IP addresses/prefixes, EPTs, and the like. At the service level, NFVO 121 may individually associate the NS and VNFFGs with usage, performance, costs, EPTs, VNFs, VLs, IP addresses/prefixes, and the like.

Advantageously, NFV MANO data communication network 100 generates a rich set of correlated NFV ALTO data, so ALTO systems 131-133 can develop accurate and granular PID-to-PID cost metrics for the NFV NS. In exemplary scenarios, MANO network 100 enables improved performance and more cost-effective video conferencing, multimedia messaging, Internet access, and the like.

Figure 2:
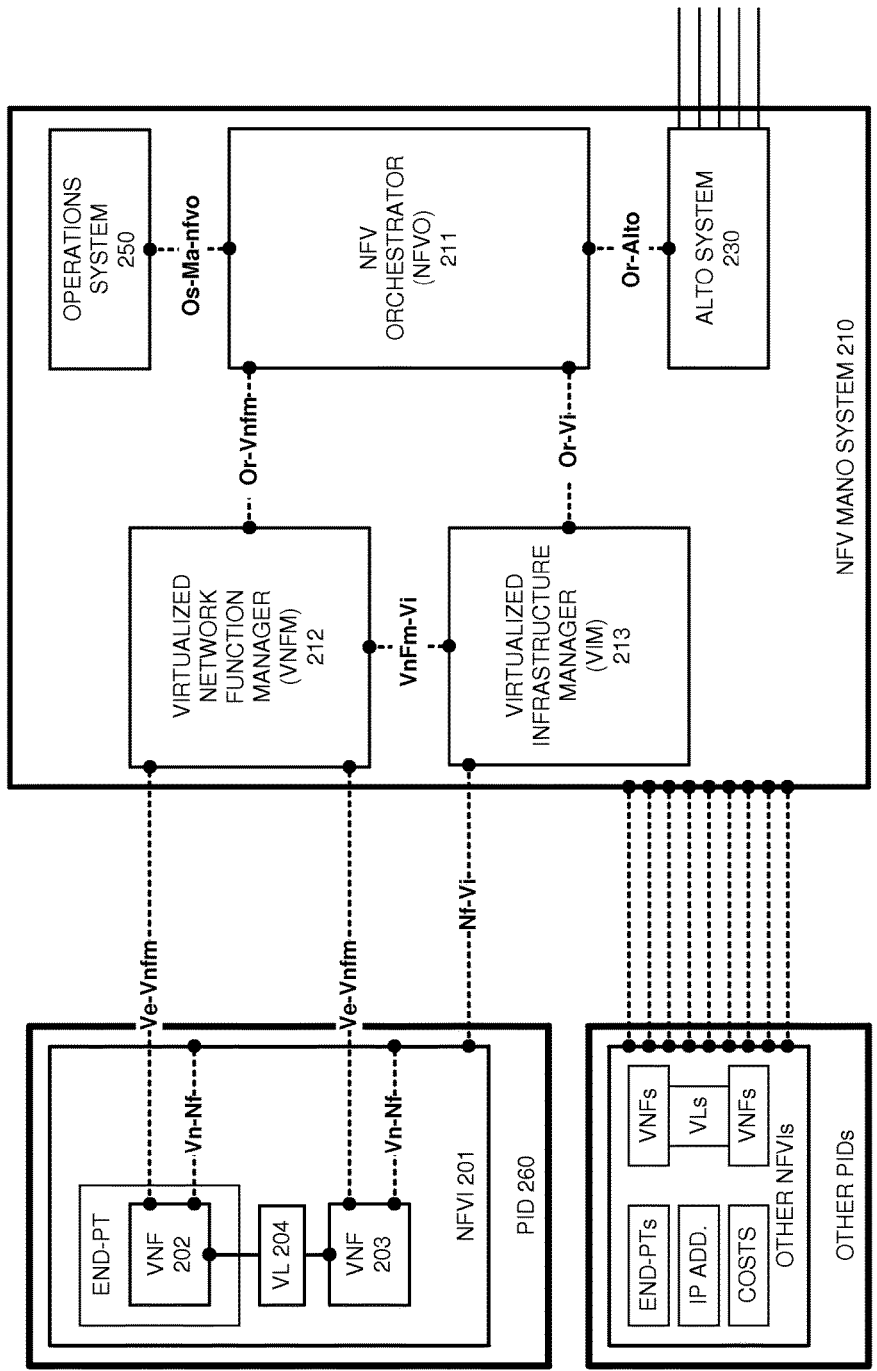
FIG. 2 illustrates an NFV MANO system having an ALTO system.

FIG. 2 illustrates NFV MANO system 210 having ALTO system 230. NFV MANO system 210 comprises NFVO 211, VNFM 212, VIM 213, ALTO system 230, and operations system 250. MANO system 210 controls NFVI 201 in PID 260. NFVI 201 comprises VNFs 202-203 and VL 204. VNF 202 is an ALTO endpoint. MANO system 210 also controls other NFVIs in other PIDs that also have VNFs and SLs along with associated endpoints, IP addresses, usage, performance, and costs.

Operations system 250 and NFVO 211 exchange operations data for the NFV NS over an Os-Ma-nfvo link. The operations data indicates VNFFGs, VNFs, VLs, NFVI requirements, and the like for the NS. NFVO 210 and VIM 213 exchange network data over an Or-Vi link. The network data indicates VMs (for the VNFs), VLs, and NFVI resource requirements for the NS. NFVO 210 and VNFM 212 exchange function data over Ve-Vnfm links. The function data indicates VNFs, VLs, and performance requirements for the NS. VNFM 212 and VIM 213 communicate over a Vnfm-Vi link.

VIM 213 and NFVI 201 exchange network data over an Nf-Vi link. The network data drives NFVI 201 to create VL 204 and execute VMs that instantiate VNFs 202-203 using the specified NFVI resource requirements for the NS. VNFM 212 and VNFs 202-203 exchange function data over Ve-Vnfm links. The function data drives executing VNFs 202-203 to perform per the requirements for the NS. Interactions between NFV MANO system 210 and the other NFVIs in the other PIDs would be similar.

NFVO 211 handles NS lifecycle management. NS lifecycle management includes the registration, cataloging, instantiation, updating, scaling, and termination of the NS and its associated VNFs, VLs, and PNFs. NFVO 211 manages the associations between VNFs, VLs, and PNFs based on the VNFFG. Scaling comprises modifying the capacity of the NS by changing its hardware allocation or its virtual resources. For example, a scaling control might restrict the number of VLs allowed between two VNFs or a change to the VNFFG. Scaling requires the monitoring of various key performance indicators to trigger NS modifications. NS lifecycle management is controlled by NS templates that indicate VNFs, PNFs, VNFFGs, parameters, and policies. VNF lifecycle management is controlled by similar VNF templates. NFVO 211 processes NFVI resource requests from VNFM 212 based on NFVI resource data from VIM 213, operations system 250 instructions, NS templates, and descriptors. NFVO 211 collects the actual NFVI resource performance, usage, and cost information.

VNFM 212 handles VNF lifecycle management. VNF lifecycle management includes the updating and scaling of the VNFs. Scaling comprises modifying the capacity of the VNF by changing its hardware allocation or its virtual resources. Scaling requires the monitoring of various performance indicators to trigger NFVI modifications. VNFM 212 controls the VNF lifecycles with VNF templates that indicate VNF Descriptors (VNFDs), parameters, and policies. VNFM 211 also requests and releases NFVI 201 resources for VNFs 202-203. VNFM 212 collects VNF 202-203 performance and usage information.

VIM 213 controls the allocation of NFVI 201 resources to support the NS. VIM 213 drives NFVI 201 to execute the VMs that instantiate VNFs 202-203. VIM 213 brokers the allocation, modification, and release of NFVI resources. VIM 213 manages the association of the virtual resources to physical resources based on the VNFFGs. VIM 213 reports NFVI 201 resources, performance, usage, and costs.

The Os-Ma-nfvo link transports various data for the NS and its VNFs including templates and descriptors, instantiation data, scaling data, NFVI performance and usage data, termination data, and other pertinent information. The Or-Alto link transports indexed NFV ALTO data and per-PID cost data for the NS. The Or-Vnfm links and the Ve-Vnfm links transport data for VNFs 202-203 indicating NFVI reservations, NFVI authorizations, NFVI releases, VNF instantiations, VNF queries, VNF updates, VNF scaling, and VNF termination. The Or-Vi links and the Nf-Vi links transport data indicating NFV VMs, VNF instantiations and terminations, NFVI reservations, allocations, releases, updates, performance measurements, and usage records. The Vnfm-Vi link transports data related to NFVI resources, VNF requirements, configuration information, and the like.

NFVI 201 and VNFs 202-203 report their actual use, performance, and costs back to NFV MANO system 210 over the various MANO links to VNFM 212 and VIM 213. VNFM 212 and VIM 213 report the use, performance, and cost data to NFVO 211 for indexing. NFVO 210 indexes the use, performance, and cost data by associating the NFVIs, VNFs, VLs and their costs with various ALTO PIDs, external domains, and EPTs. MANO 210 transfers the indexed NFV ALTO data to ALTO system 230. ALTO system 230 uses the indexed NFV ALTO data to determine the per-PID data communication costs for the NFV NS.

Figure 3:
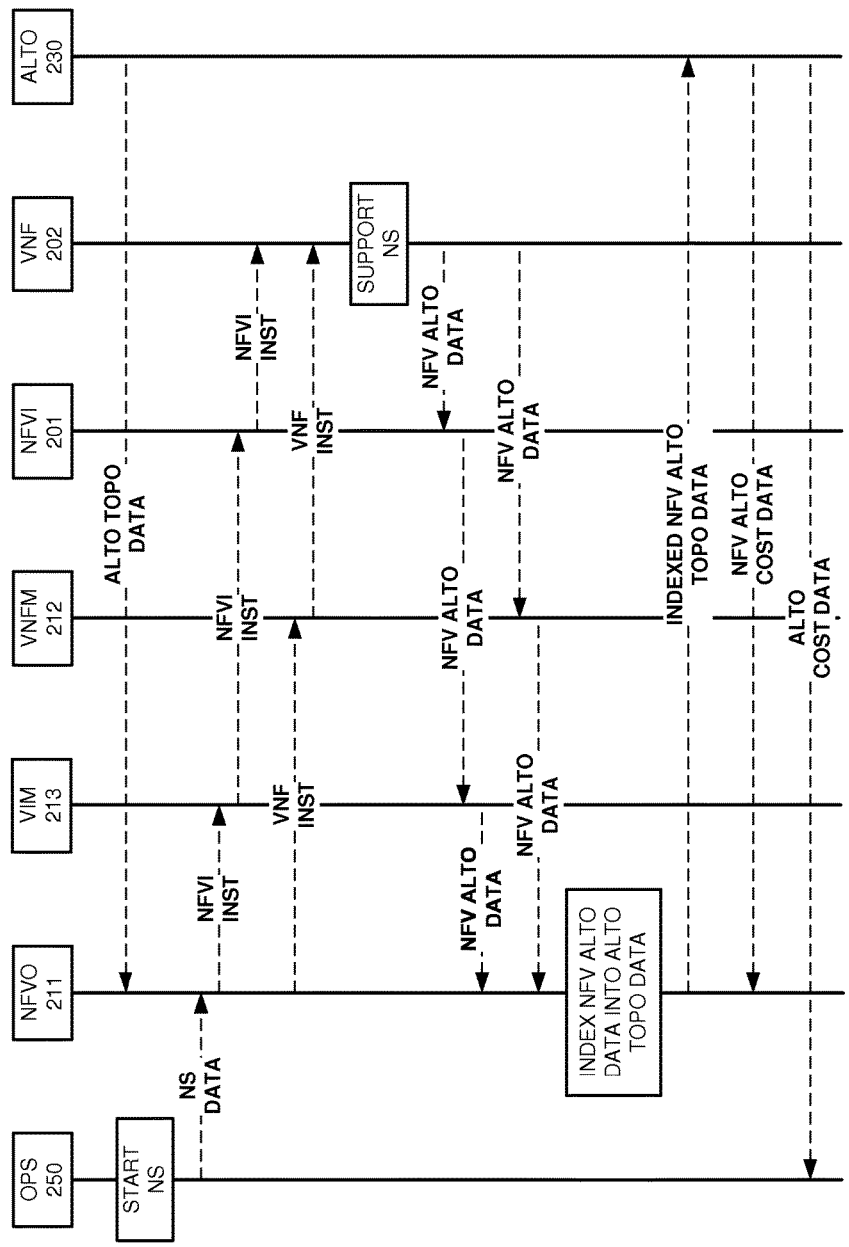
FIG. 3 illustrates an operation of an NFV MANO system having an ALTO system.

FIG. 3 illustrates an exemplary operation of NFV MANO system 210 having ALTO system 230. ALTO system 230 transfers initial ALTO topology data to NFVO 211 indicating the PIDs and their geographic boundaries, ALTO EPTs and their IP addresses/prefixes, and external ALTO domains and their IP addresses/prefixes. Network operations (OPS) 250 transfers operations data for the NS to NFVO 211. The operations data indicates VNF 202 for the NS and other service parameters, such as VNFFGs, templates, and descriptors. In some examples, VNF 202 comprises a virtual Network Element (vNE) for a data communication network like Long Term Evolution (LTE), Wireless Fidelity (WiFi), Data Over Cable Service Interface Specification (DOCSIS), Dense Wavelength Division Multiplexing (DWDM), Internet Protocol (IP), and Ethernet.

Responsive to the operations data, NFVO 211 transfers networking data in the form of NFVI instructions for the NS to VIM 213. The NFVI instructions indicate NS service parameters, VNFFGs, NFVI resource requirements, and the like. Responsive to the NFVI instructions, VIM 213 transfers NFVI instructions for the NS to NFVI 201. The NFVI instructions indicate VMs, VNFs, VLs, and NFVI resource requirements. Responsive to the NFVI instructions, NFVI 201 executes the VMs that instantiate VNF 202 to support the NS.

Contemporaneously and responsive to the operations data, NFVO 221 transfers function data in the form of VNF instructions for the NS to VNFM 212. The VNF instructions indicate NS service parameters, VNF 202 templates and descriptors, and NFVI resource requirements for the NS/VNFs. Responsive to the VNF instructions, VNFM 212 transfers VNF instructions to executing VNF 202. The VNF instructions indicate NS service parameters, VNF template and descriptor data, and NFVI resource requirements. VNF 202 processes the VNF instructions to support the NS.

NFVI 201 reports performance, resource usage, and cost metrics in NFV ALTO data sent back VIM 213. VNF 202 also reports performance, resources, and cost metrics in NFV ALTO data sent back to VNFM 212. Both VNFM 212 and VIM 213 report the NFV ALTO data to NFVO 211 for indexing. NFVO 210 indexes the performance, resource usage, and cost metrics into the initial NFV ALTO topology to correlate ALTO PIDs and external domains with the current state of the NS, its dynamic VNFFGs, NFVIs, VNFs, VLs, and their associated performance, usage, and costs.

ALTO system 230 uses the indexed NFV ALTO data to determine PID-to-PID data costs for the NS. ALTO system 230 may also determine NS costs per PID, external domain, NFVI, VNFFG, and VNF. To determine NS costs for an NFVI, the component costs of the VNFs, VLs, and processing resources in the NFVI are totaled. To determine NS costs for a VNFFG, the component costs of the VNFs, VLs, and processing resources in the VNFFG are totaled. The costs can be allocated to each PID based on the physical location of the NFVIs.

Consider a video distribution NS with mobile camera NFVIs that host VNFs at the edge of multiple VNFFGs. As the camera VNFs transit PID boundaries, the various costs per PID for the NS change and are dynamically tracked and calculated by NFV MANO system 210. Advantageously, NFV MANO system 210 generates a rich set of NFV ALTO data, so ALTO system 230 can develop accurate and granular PID cost data for the video distribution NS. In exemplary scenarios, multiple possible video paths are available between VNF EPTs, and advantageously, MANO system 210 enables immediate and effective cost comparison in a dynamically changing NFV environment.

Figure 4:
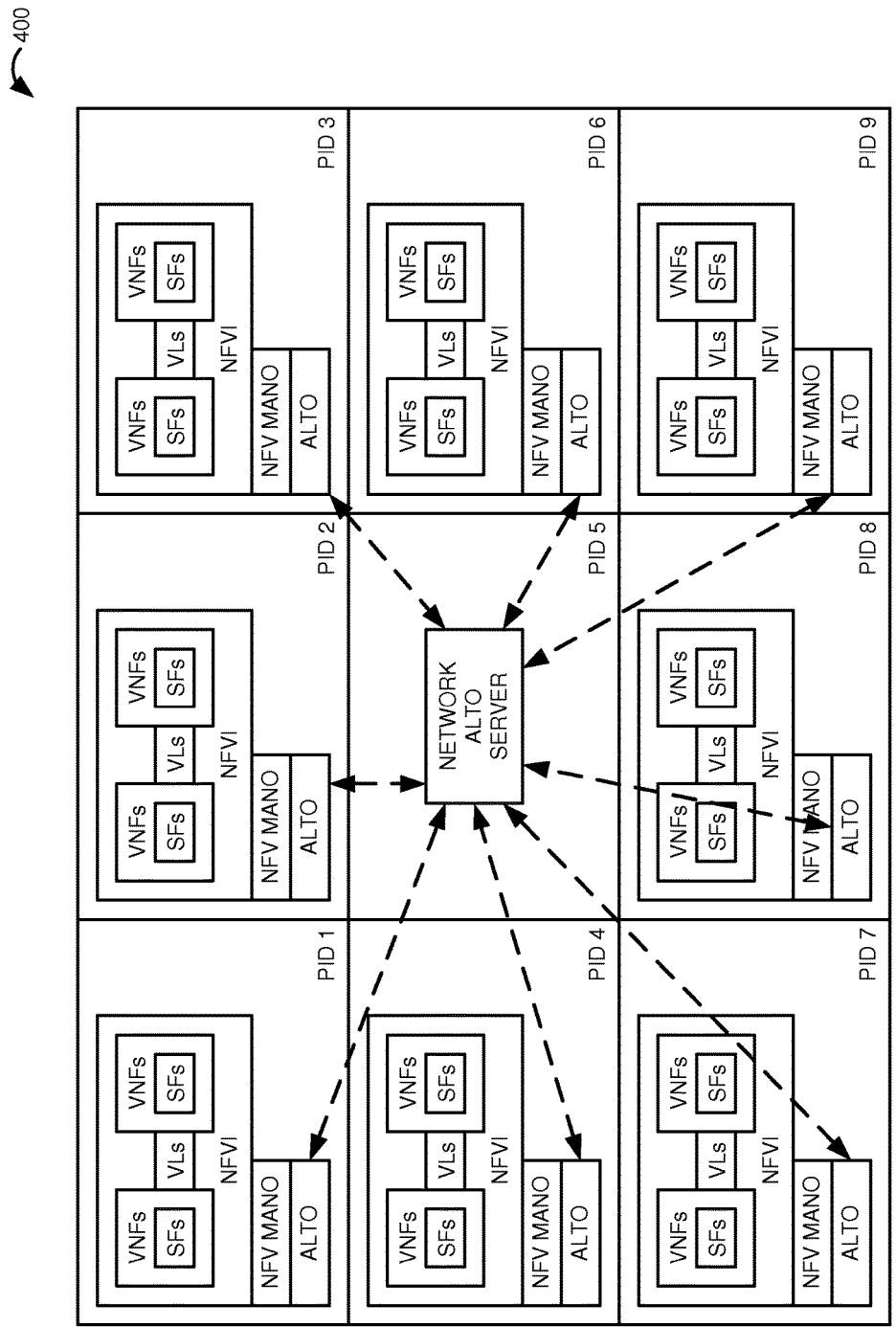
FIG. 4 illustrates a data communication network to support ALTO for NFV data services.

FIG. 4 illustrates data communication network 400 to support ALTO for NFV data services. Data communication network 400 comprises numerous NFVI, MANO, and ALTO systems located in various PIDs and an external domain. Data communication network 400 comprises an ALTO server in PID 5. Under the control of the MANO systems, the NFVIs execute VMs/VNFs and create VLs to support various NFV data services. The VNFs are now depicted with their component Service Functions (SFs). The SFs are chained together to form the VNFs for an NS. The SFs are associated with SFs, VNFs, SLs, PNFs, NFVIs, PIDs, external domains, EPTs, usage, performance, and costs.

The NFVIs report their usage, performance, and cost data back to the MANO systems. The performance data indicates the actual VMs, VNFs, SFs, and VLs that are executed, how they perform, their resource usage, and their costs. The MANO systems index the NFV data to correlate the NFV SFs, VNFs, VLs, PNFs, and NVFIs to their ALTO PIDs, EPTs, and external domains based on actual NFV execution. The MANO systems transfer the indexed NFV ALTO data to local ALTO interfaces for transfer to a centralized ALTO server system. The ALTO server system sorts and totals the indexed ALTO data to develop various NS cost models line PID-to-PID, PID-to-external, and per-PID.

For example, a per-PID cost calculation for a given NS would identify the SFs, VNFs, PNFs, VLs, and NFVIs that perform the NS in the PIDs. As revealed by the VNFFGs and the actual usage, performance, and cost data, the component costs for the SFs, VNFs, VLs, and NFVIs in each PID are totaled for the NS. A PID-to-PID NS cost is determined by totaling the per-PID NFV NS costs and then adding the costs of the physical links between NFVI systems. The physical network communication costs between the NFVIs may be tracked by the ALTO system in a conventional manner if desired.

Figure 5:
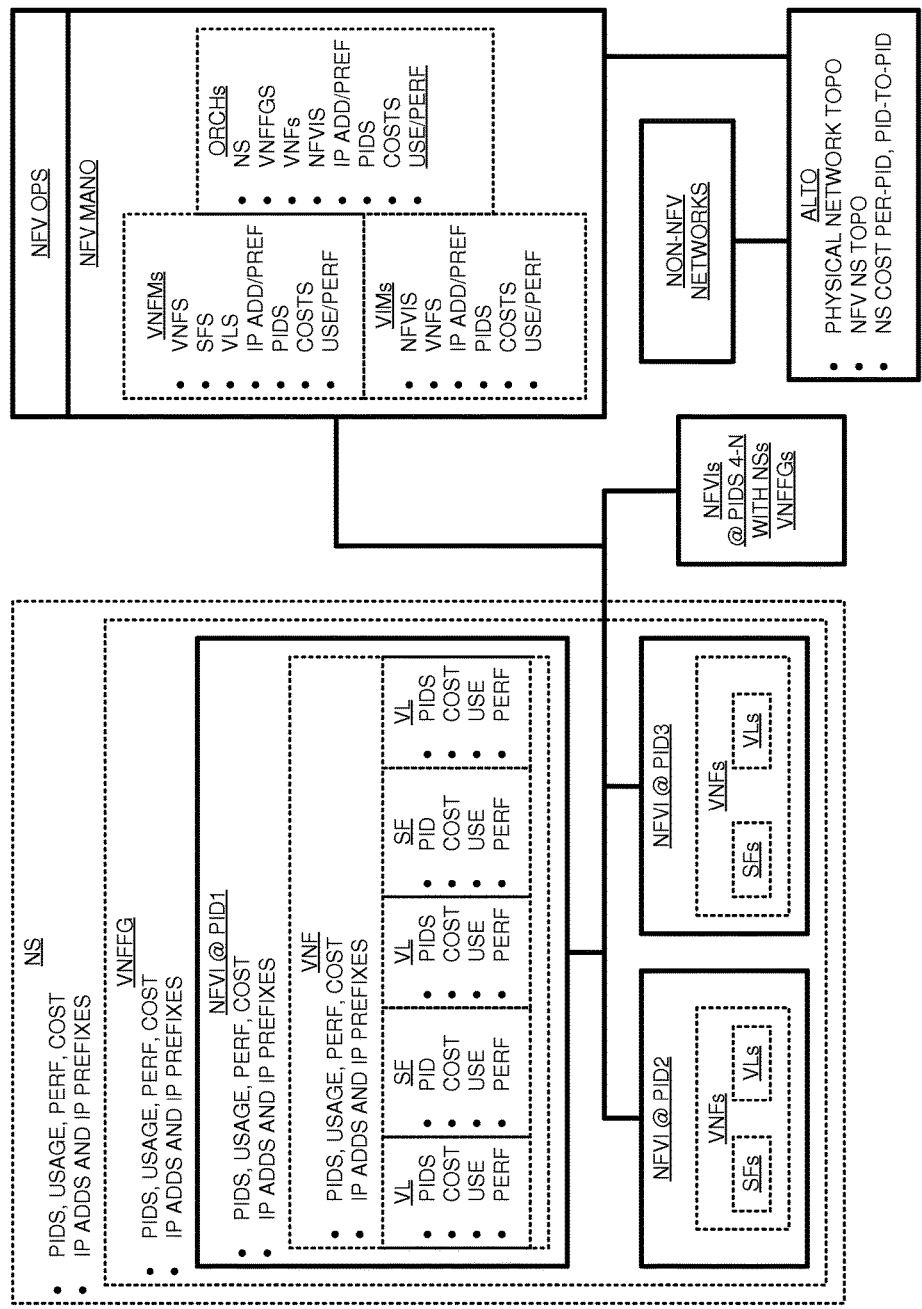
FIG. 5 illustrates NFV ALTO data indexing in a data communication network.

FIG. 5 illustrates NFV ALTO data indexing in a data communication network. The data communication network has PIDs 1-N with PIDs 1-3 being shown individually. PIDs 1-N include various NFVIs that execute VMs, VNF SFs, and VLs for the NFV NS. The NS is logically depicted along with its IP addresses and prefixes, PIDs, usage, performance, and cost. Although the NS may have multiple VNFFGs, a single VNFFG is depicted for the NS with its IP addresses and prefixes, PIDs, usage, performance, and cost. The NS and its VNFFG are physically present in PIDs 1-3. In PID 1, the NS and VNFFG comprise a VNF that is itself comprised of SFs and VLs. The VNF, SFs and VLs have IP addresses and prefixes, PIDs, usage, performance, and costs. The other NS, VNFFGs, and NFVIs in PIDs 4-N are similar.

The NFV MANO interacts with NFV operations to install, control, and de-install each NS. The NFV MANO drives the NFVIs to perform the NS using the chained VNFs, SFs, and VLs and collects the resulting PID, usage, performance, and cost information. Note that the SFs, VLs, VNFs, and NFVIs are often scaled up and down during actual operations to introduce changes into the actual usage, performance, and cost data.

The NFV MANO has VNFMs to aggregate and pre-correlate the usage, performance, and cost data of the VNFs, SFs, and VLs. The NFV MANO has VIMs to aggregate and pre-correlate the usage, performance, and cost data of the NFVIs, PNFs, and VNF VMs. The NFV MANO has NFVOs to aggregate and correlate the usage, performance, and cost data of the NSs NS, VNFFGs, and VNFs. Additional data like PIDs, EPTs, external domains, IP addresses, and IP prefixes are also correlated to the SFs, VLs, VNFs, PNFs, NFVIs, VNFFGs, and NS.

The ALTO system receives the indexed NFV ALTO topology data from the NFV MANO. The ALTO system also receives physical network data from conventional non-NFV systems. The ALTO system generates PID cost models using the indexed NFV ALTO topology data and the non-NFV topology data. The PID cost models indicate per-PID costs and PID-to-PID costs for various NS in the dynamically changing NFV environment.

Figure 6:
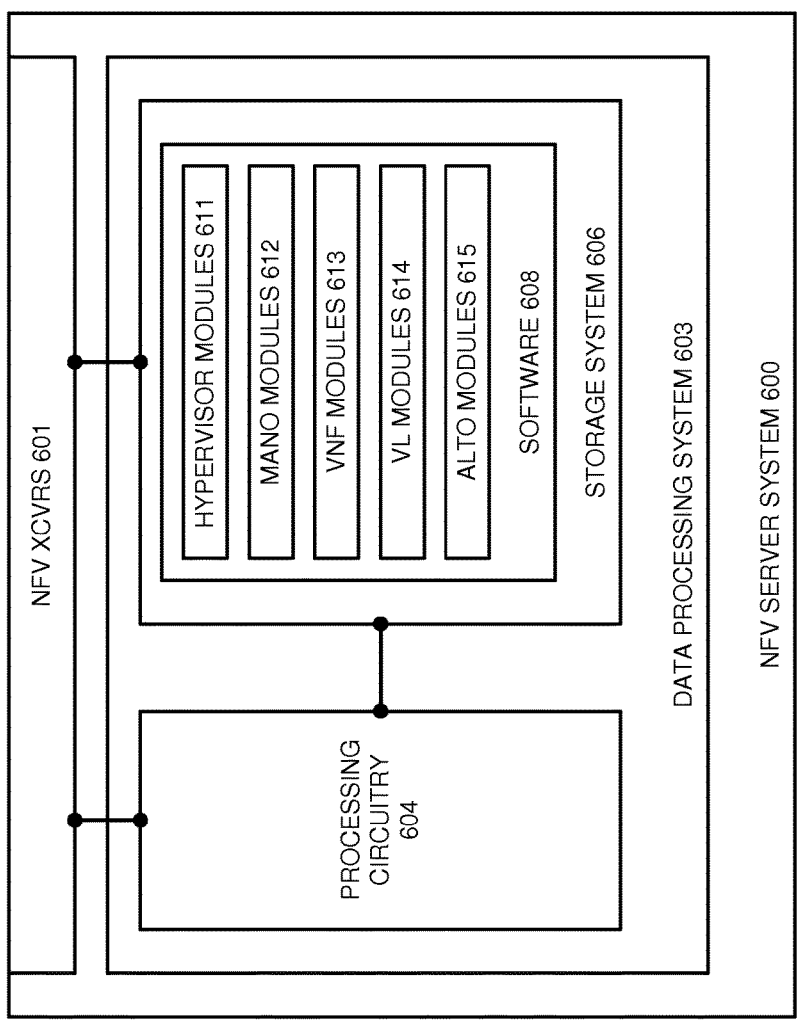
FIG. 6 illustrates an NFV server system with ALTO.

FIG. 6 illustrates Network Function Virtualization (NFV) server system 600 to support an NFV NS with ALTO. NFV server system 600 is an example of systems 100, 210, and 400, although these systems may use alternative configurations and operations. NFV server system 600 comprises NFV transceivers 601. NFV transceivers 601 comprise communication components, such as ports, bus interfaces, signal processors, memory, software, and the like. NFV transceivers 601 represent NFV PNFs and exchange user data communications with various physical systems and devices.

NFV server system 600 comprises data processing system 603. Data processing system 603 comprises processing circuitry 604 and storage system 606. Storage system 606 stores software 608. Software 608 includes software modules 611-615. Some conventional aspects of NFV server system 600 are omitted for clarity, such as power supplies, enclosures, and the like. NFV server system 600 may be centralized or distributed.

In data processing system 603, processing circuitry 604 comprises server blades, circuit boards, bus interfaces, integrated circuitry, and associated electronics. Processing circuitry 604 comprises Central Processing Units (CPUs) with associated cache and bus structures. Storage system 606 comprises non-transitory, machine-readable, data storage media, such as flash drives, disc drives, memory circuitry, servers, and the like. Software 608 comprises machine-readable instructions that control the operation of processing circuitry 604 when executed. Software 608 includes software modules 611-615 and may also include operating systems, applications, data structures, virtual network elements, utilities, and the like. All or portions of software 608 may be externally stored on one or more storage media, such as circuitry, discs, and the like.

When executed by processing circuitry 604, hypervisor modules 611 direct circuitry 604 to create an NFV environment, execute VMs to instantiate VNFs, and provide NFV data reporting. When executed by processing circuitry 604, MANO modules 612 direct circuitry 604 to manage and orchestrate the NFVI—including the collection and indexing of NFV ALTO data. When executed by processing circuitry 604, VNF modules 613 and VL modules 614 direct circuitry 604 to perform data processing tasks in support of the NS like data routing, quality-of-service management, media coding, and the like. When executed by processing circuitry 604, ALTO modules 613 direct circuitry 604 to determine ALTO per-PID, PID-to-PID, and PID-to-external costs for the NS at various NFV levels based on the indexed NFV ALTO data.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a Network Function Virtualization (NFV) Management and Orchestration (MANO) data communication system to support an Application Layer Traffic Offload (ALTO) system for a Network Service (NS), the method comprising:

MANO computer system circuitry processing an NFV MANO orchestrator and an NFV MANO Virtualized Infrastructure Manager (VIM) and responsively exchanging network data to support the NS;

the MANO computer system circuitry processing the NFV MANO orchestrator and an NFV MANO Virtual Network Function Manager (VNFM) and responsively exchanging function data to support the NS;

the MANO computer system circuitry processing the NFV MANO VIM and responsively exchanging the network data with NFV Infrastructures (NFVIs) that execute Virtual Machines (VMs) that instantiate Virtual Network Function (VNFs) to support the NS;

the MANO computer system circuitry processing the NFV MANO VNFM and responsively exchanging function data with the VNFs to support the NS;

the MANO computer system circuitry processing the NFV MANO orchestrator and responsively indexing some of the network data and the function data to generate NFV ALTO topology data that associates individual ALTO Provider Identifiers (PIDs) with individual ones of the NFVIs, that associates the individual ALTO PIDs with individual ones of the NFV VNFs, that associates an ALTO external domain with individual NFV Virtual Links (VLs), that associates the individual ones of the NFV VLs with individual NFVI resource usage, and that associates the individual ones of the NFV VLs with individual VL usage costs; and the MANO computer system circuitry processing the NFV MANO orchestrator and responsively transferring the NFV ALTO topology data for delivery to the ALTO system.

2. The method of claim 1 further comprising the MANO computer system circuitry processing the NFV MANO orchestrator and responsively indexing the network data and the function network data to generate the NFV ALTO topology data that associates the individual ones of the NFV VNFs with individual NFVI resource usage.

3. The method of claim 1 further comprising the MANO computer system circuitry processing the NFV MANO orchestrator and responsively indexing the network data and the function network data to generate the NFV ALTO topology data that associates the individual ones of the NFV VNFs with individual VNF usage costs.

4. The method of claim 1 further comprising the MANO computer system circuitry processing the NFV MANO orchestrator and responsively indexing the network data and the function network data to generate the NFV ALTO topology data that associates the individual ones of the NFV NFVIs with individual NFVI resource usage.

5. The method of claim 1 further comprising the MANO computer system circuitry processing the NFV MANO orchestrator and responsively indexing the network data and the function data to generate the NFV ALTO topology data that associates the individual ones of the NFV NFVIs with individual NFVI usage costs.

6. The method of claim 1 further comprising the MANO computer system circuitry processing the NFV MANO orchestrator and responsively indexing the network data and the function network data to generate the NFV ALTO topology data that associates the individual ALTO PIDs with individual NFV VNF Forwarding Graphs (FGs).

7. The method of claim 6 further comprising the MANO computer system circuitry processing the NFV MANO orchestrator and responsively indexing the network data and the function network data to generate the NFV ALTO topology data that associates the individual NFV VNF Forwarding Graphs (FGs) with individual NFVI resource usage and individual VNFFG usage costs.

8. A Network Function Virtualization (NFV) Management and Orchestration (MANO) data communication system to support an Application Layer Traffic Offload (ALTO) system for a Network Service (NS), the NFV MANO data communication system comprising:

MANO computer system memory storing an NFV MANO orchestrator, an NFV MANO Virtualized Infrastructure Manager (VIM), and an NFV MANO Virtual Network Function Manager (VNFM);

MANO computer system circuitry configured to process the NFV MANO orchestrator and the NFV MANO VIM to exchange network data to support the NS;

the MANO computer system circuitry configured to process the NFV MANO orchestrator and the NFV MANO VNFM to exchange function data to support the NS;

the MANO computer system circuitry configured to process the NFV MANO VIM to exchange the network data with NFV Infrastructures (NFVIs) that execute Virtual Machines (VMs) that instantiate Virtual Network Functions (VNFs) to support the NS;

the MANO computer circuitry configured to process the NFV MANO VNFM to exchange the function data with the VNFs to support the NS; and the MANO computer circuitry configured to process the NFV MANO orchestrator to index some of the network data and the function data to generate NFV ALTO topology data that associates individual ALTO Provider Identifiers (PIDs) with individual ones of the NFVIs, that associates the individual PIDs with individual ones of the NFV VNFs, that associates an individual ALTO external domain with individual NFV Virtual Links (VLs), that associates the individual ones of the NFV VLs with individual NFVI resource usage, and that associates the individual ones of the NFV VLs with individual VL usage costs; and the MANO computer circuitry configured to process the NFV MANO orchestrator to transfer the NFV ALTO topology data for delivery to the ALTO system.

9. The NFV MANO data communication system claim 8 wherein the MANO computer circuitry is configured to process the NFV MANO orchestrator to index the network data and the function network data to generate the NFV ALTO topology data that associates the individual ones of the NFV VNFs with individual NFVI resource usage.

10. The NFV MANO data communication system claim 8 wherein the MANO computer circuitry is configured to process the NFV MANO orchestrator is to index the network data and the function network data to generate the NFV ALTO topology data that associates the individual ones of the NFV VNFs with individual VNF usage costs.

11. The NFV MANO data communication system claim 8 wherein the MANO computer circuitry is configured to process the NFV MANO orchestrator to index the network data and the function network data to generate the NFV ALTO topology data that associates the individual ones of the NFV NFVIs with individual NFVI resource usage.

12. The NFV MANO data communication system claim 8 wherein the MANO computer circuitry is configured to process the NFV MANO orchestrator to index the network data and the function data to generate the NFV ALTO topology data that associates the individual ones of the NFV NFVIs with individual NFVI usage costs.

13. The NFV MANO data communication system claim 8 wherein the MANO computer circuitry is configured to process the NFV MANO orchestrator to index the network data and the function network data to generate the NFV ALTO topology data that associates that associates the individual ALTO PIDs with individual NFV VNF Forwarding Graphs (FGs).

14. The NFV MANO data communication system claim 13 wherein the MANO computer circuitry is configured to process the NFV MANO orchestrator to index the network data and the function network data to generate the NFV ALTO topology data that associates the individual NFV VNF Forwarding Graphs (FGs) with individual NFVI resource usage and with individual VNFFG usage costs.

* * * * *